(12) United States Patent
Antilla et al.

(10) Patent No.: US 11,304,215 B2
(45) Date of Patent: Apr. 12, 2022

(54) METHODS AND APPARATUS FOR A PORTABLE COMMUNICATION DEVICE

(71) Applicant: MOTOROLA SOLUTIONS, INC., Chicago, IL (US)

(72) Inventors: Mark Antilla, Davie, FL (US); Graeme Johnson, Plantation, FL (US); Mark A Boerger, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 383 days.

(21) Appl. No.: 16/525,882

(22) Filed: Jul. 30, 2019

(65) Prior Publication Data
US 2021/0037545 A1 Feb. 4, 2021

(51) Int. Cl.
| | |
|---|---|
| *H04W 72/12* | (2009.01) |
| *H04W 52/02* | (2009.01) |
| *H04W 88/06* | (2009.01) |
| *H04W 4/10* | (2009.01) |
| *H04W 4/90* | (2018.01) |
| *H04W 76/40* | (2018.01) |
| *H04W 76/50* | (2018.01) |

(52) U.S. Cl.
CPC ... *H04W 72/1215* (2013.01); *H04W 52/0209* (2013.01); *H04W 52/0225* (2013.01); *H04W 4/10* (2013.01); *H04W 4/90* (2018.02); *H04W 76/40* (2018.02); *H04W 88/06* (2013.01); *Y02D 30/70* (2020.08)

(58) Field of Classification Search
CPC . H04W 72/1215; H04W 88/06; H04W 76/40; H04W 76/50; H04W 4/10; H04W 4/90; H04W 52/0225; H04W 52/0209; Y02D 30/70
See application file for complete search history.

(56) References Cited

U.S. PATENT DOCUMENTS

| | | |
|---|---|---|
| 6,643,522 B1 | 11/2003 | Young |
| 7,197,291 B2 | 3/2007 | Mach et al. |
| 8,712,331 B2 | 4/2014 | Makhlouf et al. |
| 8,995,918 B2 | 3/2015 | Scribano et al. |
| 9,008,020 B2 | 4/2015 | Yacobi et al. |
| 9,066,363 B2 | 6/2015 | Anderson et al. |
| 9,231,711 B2 | 1/2016 | Ericson |
| 9,247,413 B1 | 1/2016 | Sahoo et al. |
| 9,313,013 B2 | 4/2016 | Scribano et al. |
| 9,363,845 B1 | 6/2016 | Sahoo et al. |

(Continued)

FOREIGN PATENT DOCUMENTS

WO 2018125686 A2 7/2018

OTHER PUBLICATIONS

The International Search Report and the Written Opinion corresponding patent serial No. PCT/US2020/042243 filed Jul. 16, 2020, dated Oct. 21, 2020, all pages.

(Continued)

*Primary Examiner* — Omar J Ghowrwal
(74) *Attorney, Agent, or Firm* — Barbara R. Doutre

(57) ABSTRACT

Improved management of broadband data communications is provided to a converged portable communication device. The converged device provides restricted broadband communications during a normal operative mode of the device. Upon detecting a user-initiated external event, the converged device enters a pseudo-off state in which unrestricted broadband data transfers take place between an applications processor and a broadband modem, while LMR operations controlled by a baseband processor and baseband modem, are turned off

22 Claims, 3 Drawing Sheets

(56) References Cited

U.S. PATENT DOCUMENTS

| | | |
|---|---|---|
| 9,433,012 B2 | 8/2016 | Gruet et al. |
| 9,461,696 B1 | 10/2016 | Baker et al. |
| 9,504,058 B2 | 11/2016 | Shperling et al. |
| 9,615,299 B1 | 4/2017 | Bercovici et al. |
| 9,642,154 B2 | 5/2017 | Makhlouf et al. |
| 9,668,300 B2 | 5/2017 | Anderson et al. |
| 9,749,263 B2 | 8/2017 | Jin et al. |
| 9,979,069 B2 | 5/2018 | Faraone et al. |
| 10,039,041 B2 | 7/2018 | Bercovici et al. |
| 10,135,139 B2 | 11/2018 | Contreras et al. |
| 10,264,587 B2 | 4/2019 | Hiben et al. |
| 10,334,473 B2 | 6/2019 | Bercovici et al. |
| 2012/0149421 A1* | 6/2012 | Korus .................... H04W 4/10 455/518 |
| 2013/0183904 A1 | 7/2013 | Hiben et al. |
| 2014/0220926 A1 | 8/2014 | Shikama et al. |
| 2015/0148088 A1 | 5/2015 | Ericson |
| 2018/0092040 A1* | 3/2018 | Heiska ................. H04W 76/28 |
| 2019/0141508 A1* | 5/2019 | Alfaro ............... H04M 1/72421 |
| 2020/0008083 A1* | 1/2020 | Lei ........................ H04W 24/04 |
| 2020/0343918 A1* | 10/2020 | Faraone .............. H04B 1/0064 |
| 2021/0037536 A1* | 2/2021 | Alfaro ................... H04B 1/406 |

OTHER PUBLICATIONS

Boerger, Mark. A et al.: "Method and Apparatus for Managing Power-Up of a Portable Communication Device," U.S. Appl. No. 16/392,168, filed Apr. 23, 2019, all pages.

Farone et al.: "Antenna System for a Portable Communication Device", U.S. Appl. No. 16/393,890, filed Apr. 24, 2019, all pages.

* cited by examiner

METHODS AND APPARATUS FOR A PORTABLE COMMUNICATION DEVICE

FIELD OF THE INVENTION

This application pertains to portable communication devices and more particularly to managing broadband communications taking place normal operations and during power transitions of a converged portable communication device.

BACKGROUND OF THE INVENTION

Portable battery powered communication devices are often utilized in public safety environments, such as law enforcement, fire rescue, and the like, to provide mission critical communications operating over a public safety platform, such as a land mobile radio (LMR) platform. There is an increased desire to expand the functionality of public safety communication devices to incorporate additional non-mission critical features which run on different platforms. Such expanded capabilities may be achieved through the use of a device incorporating two different modems under the control of two different processors. Such devices may be referred to as converged devices. The reliable management of data transmissions in a converged device is needed to ensure that mission critical communications are maintained and not degraded, even during transfers of large amounts of broadband data. However, managing large amounts of broadband data in a converged device has proven to be a challenge, as converged devices which operate multiple modems at the same time face issues associated with RF interference, current drain, and processing power.

Hence, an improved approach to managing broadband data in a converged portable communication device is needed.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
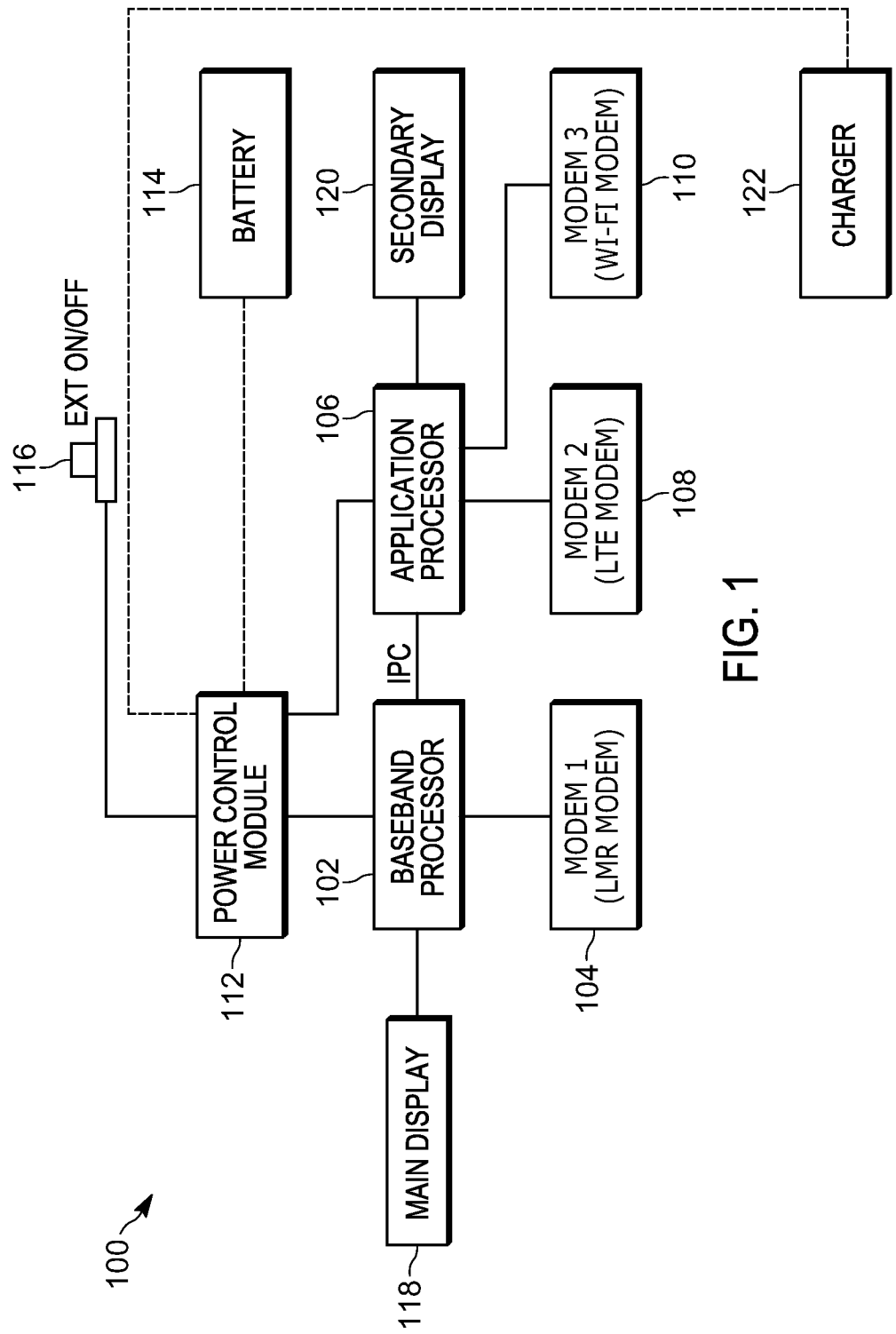
FIG. 1 is a block diagram of a portable communication device formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein an apparatus and method for managing broadband communications in a portable communication device. The portable communication device is a converged device operated by at least two modems under the respective control of at least two different processors, an applications processor and a baseband processor. While the embodiments have been described in terms of a portable communication device providing land mobile radio (LMR) and long term evolution (LTE), it is to be appreciated that other converged devices operating using different modems which are susceptible to RF interference, current supply, and processor loading conditions, can also benefit from the embodiments provided herein. Low priority broadband communications, such as the transfer of analytical data pertaining to radio management and device management, which would take place during normal operations are now scheduled to take place during power transitions of the portable communication device. The embodiments provided herein facilitate scheduling of non-critical broadband data transfers such as device diagnostics, evidence uploads, and software updates and configurations to name a few, such that these non critical broadband transfers take place outside of the standard mission critical narrowband operations, which control such features as scan, push-to-talk (PM, loud audio, and emergency.

FIG. 1 is a block diagram of a portable communication device 100 formed and operating in accordance with some embodiments. The portable communication device 100 comprises a baseband processor (BP) 102 operatively coupled to a first, narrowband modem 104 and an applications processor (AP) 106 operatively coupled to a second broadband, modem 108. The applications processor (AP) 106 may further be operatively coupled to additional modems, such as a third, broadband modem 110. For the purposes of this application, a narrowband modem is one that controls mission critical data and voice and operates over narrowband frequencies. For the purposes of this application, the broadband modem(s) controls non-mission critical data and operates over broadband frequencies. Portable communication device 100 operating in accordance with the embodiments, manages the scheduling of non-critical broadband data transfers such as device diagnostics, evidence uploads, and software updates and configurations to name a few, such that these non critical broadband transfers take place outside of the standard mission critical narrowband operations, which control such features as mission critical scan, push-to-talk (PIT), loud audio, and emergency.

A power control module 112 is operatively coupled to the baseband processor 102 and the applications processor 106. A battery 114 and external power switch 116 are operatively coupled to the power control module 112 which gates power to the device. The external power switch 116 is a user controlled knob for turning the portable communication device on and off, The battery 114 is attachable to and detachable from the portable communication device. A charger 122 may be used to charge the portable communication device 100 with battery 114 attached thereto.

The power control module 112 may comprise a bank of internal switches responsive to a plurality of different user-initiated external events. Such user-initiated external events may comprise: turning off the external on/off switch 116, attaching the battery 114 to an already turned off communication device, or attaching a charger 122 to the communication device where the battery is already attached and the communication device is already off. It is appreciated that other circuitry, such as power amplifiers, audio circuitry, filters, receiver circuitry and transceiver circuitry have not been shown in order to maintain simplicity and clarity to the described embodiments.

The portable communication device 100 is operable as a converged device in which at least two modems, narrowband modem 104 and one or more of broadband modems 108, 110 are managed simultaneously during converged operation. For the purposes of this application, converged operation of the first, narrowband modem, and the second, broadband modem are described. The embodiments provided herein provide improved management of broadband communications during user initiated external events.

In accordance with some embodiments, in response to the power control module 112 being turned on, the portable communication device, with battery already attached, is configured to enter a broadband restricted state in which transfers of broadband data between the applications processor 106 and the broadband modem 108 are limited, and transfers of narrowband data between the baseband processor 102 and the narrowband modem 104 are unrestricted. The broadband restricted state advantageously reduces current drain and mitigates RF interference to the narrowband modem. The broadband restricted state is one in which large broadband data transfers are prohibited and the broadband modem is operating in a lower power consumption mode.

In some embodiments the broadband restricted state may be triggered by the operative state in a converged device in which both BB and NB modems are simultaneously active. The broadband restricted state may, in some embodiments, be triggered in response to potential interference between nearby, non-overlapping spectrums associated with the simultaneous operation of the first, narrowband modem, and the second, broadband modem. In some embodiments the broadband restricted state may be triggered by the operative state in a converged device in which both BB and NB modems are simultaneously active.

In response to the device power control module 112 being turned off, an AP-BP handshake is triggered informing both the applications processor 106 and the baseband processor 102 of a power down which further triggers the transfer of pending broadband data from the baseband processor to the applications processor. The baseband processor 102 powers down, thereby guaranteeing the first modem is off. A broadband unrestricted state is entered into by the applications processor 106, in which the applications processor transfers high bandwidth broadband data to the broadband modem 104. The source for this broadband data can be a combination of (1) non-mission critical data that the application processor has pending and/or (2) the non-mission critical data transferred from the baseband processor. The transfer of broadband data in the broadband unrestricted state continues until the applications processor is transitioned to an off state.

The applications processor is transitioned to an off state in response to one of: completion of the applications processor transferring the high bandwidth broadband data (comprises the pending broadband data from the baseband processor along with any pending broadband data present in the applications processor) to the broadband modem, or expiration of a configurable time-out timer. For example, the time out timer may be set of a predetermined period of time, such as 30 minutes or some other suitable timeframe sufficient for analytical data pertaining to the communication device to be transferred.

During the broadband unrestricted state the portable communication device appears to be off to the user, for example displays 118, 120 are off, as well as mission critical functions associated with the first modem. For example, the first, LMR, modem 104 is off, while the second (LTE) modem is fully active. This allows the applications processor 106 to transfer the high bandwidth broadband data to the broadband modem without impacting operations of the first modem and without impacting performance of the converged device. For example, LTE analytical data pertaining to radio management can be transferred from the applications processor 106 to the LTE modem 108 without interfering with the LMR modem 104. The high bandwidth broadband data is non-mission critical data and may comprise analytical data pertaining to operations of the portable communication device, such as diagnostics, log reports, error reports, sensor data, firmware data, and/or provisioning data to name a few.

The management of broadband data provided by the embodiments takes advantage of the fact that turning off a portable communication device is a very user-intuitive function. Users turning off the external control knob 116 do not intend to use the radio features, and as such the embodiments take advantage of power transition triggers to the device to engage broadband data communications for low priority data. Thus, the management of broadband data provided by the embodiments avoids the need for any additional user-initiated service mode, thereby minimizing any additional actions by the user.

Another very user-intuitive action is the attachment or swapping or changing of batteries to a device that is shut off. The installation, or transfer, of low priority broadband data communications can also advantageously take place in response to battery attachment to an already turned off device being detected at the power control module 112. The power control module 112 in this scenario detects that the external control knob 116 is in the off position while a battery 114 is attached and after determining that the attached battery has a sufficient operative charge, responsively applies power only to the application processor 106 for the purpose of sending broadband data over the broadband modem.

Additionally, insertion of the portable communication device into the charger 122 (with the battery 114 attached and the portable device switch off) can be detected by the power control module 112 and used to trigger the applications processor 106 to turn on and place the communications device in a non-restricted broadband state for the transfer of data, while LMR communications remain off In some embodiments, the insertion into the charger 122 provides instantaneous operative battery levels, in other embodiments, the power control module 112 must still confirm that the attached battery has also obtained an operative charge.

Hence, the benefits of low priority broadband communications can be achieved by detecting, by the power control module 112, the application of a power source, that places the portable communication device in a pseudo-off states in which LMR operations are off and broadband data transfers are enabled, by the applications processor 106, in an unrestricted mode.

Figure 2:
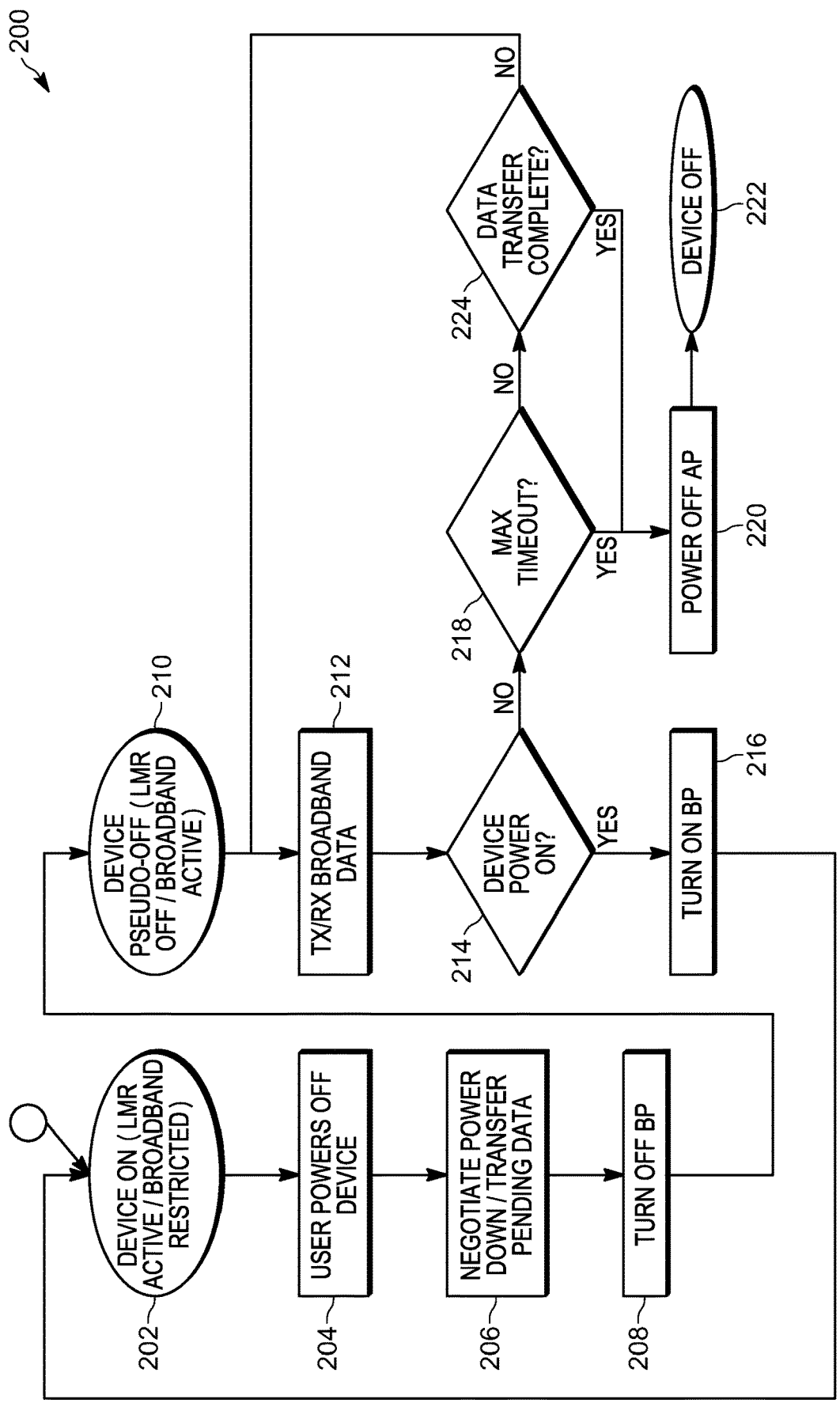
FIG. 2 is a flowchart of a method for managing broadband data communications in a portable communication device in accordance with some embodiments.

FIG. 2 is a flowchart of a method 200 for managing broadband data communications in a portable communication device in accordance with some embodiments. The method 200 begins at 202 by turning on the portable communication device via a user controlled input, such as an external control knob. Turning on the portable device enables unrestricted narrowband operation via a baseband processor and a narrowband modem (for example LMR), and enables restricted broadband operation via an applications processor and a broadband modem (for example LTE). Hence, the portable communication device is said to be communicating with converged operation.

Powering down of the portable communication device takes place at 204 via a user controlled input, which initiates powering down the baseband processor. Pending data can be transferred at 206 from the baseband processor to the applications processor during power down.

The baseband processor being turned off at 208 results in shutting down narrowband operations and activating unrestricted broadband operation at 210. Broadband data is transmitted and received at 212 during the unrestricted mode of broadband operation.

The method 200 detects whether the external power control switch is turned back on or remains off at 214. When the device is turned back on (by the external control switch), the baseband processor is turned back on at 216 and the method returns back to unrestricted narrowband operation and restricted broadband operation at 202.

In response to the external power control switch remaining off at 214, the method moves to verifying a status of a timeout timer at 218. The timeout timer sets a predetermined time for which the unrestricted transmit/receive broadband data can take place between the applications processor and the broadband modem. For example, the timer may be set to allow update installations to take place during the unrestricted broadband mode for up to 30 minutes or some other predetermined suitable timeframe.

In response to the timeout timer having expired at 218, the applications processors is powered off at 220, thereby turning off the portable device at 222.

In response to the timeout timer having not expired at 218, a verification is made at 224 as to whether the broadband data transfer is complete. Completion of the broadband data transfer at 224 triggers the powering down of the applications processor at 220, and the turning off of the portable communication device at 222.

When the time out timer has not expired at 218 and the data transfer of broadband data has not been competed at 224, then the method returns back to 212 for the continued transfer of broadband data in the unrestricted broadband mode. Again, narrowband communications (e.g. LMR) are off during the broadband unrestricted mode, as was previously established at 210.

Figure 3:
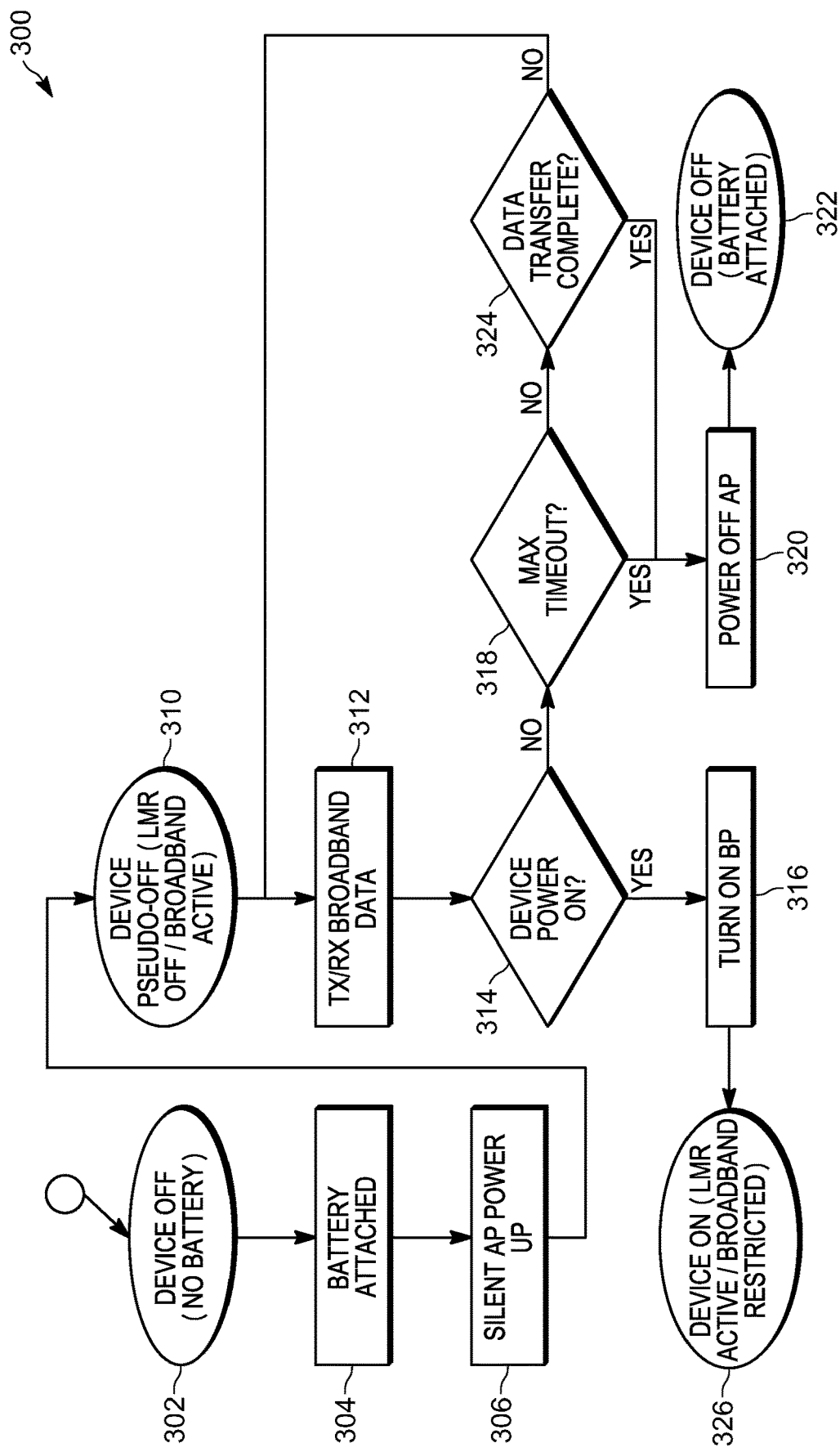
FIG. 3 is a flowchart of a method for managing broadband data communications during battery attachment of a portable communication device in accordance with some embodiments.

FIG. 3 is a flowchart of a method 300 for managing low priority broadband data during battery attachment of a portable communication device in accordance with some embodiments. Method 300 can also be applied to managing low priority broadband data in during charger insertion. The method begins at 302 with the portable communication device being off and no battery attached. Battery attachment is detected at 304 to the turned off device. Although the external power control switch 116 is off, the power control module 112 detects the presence of a battery attachment event and operable battery power and applies power to the application processor 106. In some embodiments, the battery attached 304 can also be entered via the detection of a charger 122 insertion event while the device is turned off along with operable power being present at the battery 114. Powering up 306 of the applications processor 106 places the portable communication device in a pseudo-off state at 310 in which LMR communications are off and broadband communications are active. The broadband communications are said to be operating in a broadband unrestricted mode at 310, and thus broadband data can be transmitted and received (TX/RX broadband data) at 312. For example, the TX/RX broadband data can be transferred between the broadband modem 108 and the applications processor 106 of FIG. 1.

Broadband data is transmitted and received at 312 during the unrestricted broadband mode of operation. The method 300 proceeds to detect, at 314, whether the device power has been turned on (via the external control switch 116 of FIG. 1) or power remains turned off. When the device power remains off at 314, the method moves to verifying a status of a timeout timer at 318. The timeout timer sets a predetermined time for which the unrestricted transmit/receive broadband data can take place. During this time non-mission critical broadband data transfers may take place, such as device diagnostics, evidence uploads, and software updates and configurations to name a few, These non-mission critical broadband transfers advantageously take place outside of the standard mission critical narrowband operations.

In response to the timeout timer having expired at 318, the applications processor is powered off at 320, thereby turning off the portable device at 322, with the battery attached.

In response to the timeout timer having not expired at 318, a verification is made at 324 as to whether the broadband data transfer is complete. Completion of the broadband data transfer at 324 triggers the powering down of the applications processor at 320, and the turning off of the portable communication device at 322, with the battery attached.

When the time out timer has not expired at 318 and the data transfer of broadband data has not been competed at 324, then the method returns back to 312 for the continued transfer of broadband data in the unrestricted broadband mode. Again, narrowband communications (e.g. LMR) are off during the broadband unrestricted mode, as was previously established at 310.

Returning to 314, when the device power is turned on (via the external control switch 116 of FIG. 1), the baseband processor is turned on at 316 and the operation of unrestricted narrowband operation and restricted broadband is enabled at 326, for converged operation of the portable communication device.

The approaches provided herein facilitate the implementation of converged device by advantageously managing two processors and two modems operating in parallel. Issues associated with RF interference, current drain and processing power have been addressed for a variety of use cases. For example, the approach minimizes peak power consumption of the application processor and broadband modem when a user is transmitting and receiving LMR voice. As another example, the user may disable alternate modems that do not introduce LMR RF interference, such as those using WIFI technology, for the purpose of battery savings. In such a scenario, the approach minimizes issues with a converged device operating on a 7/800 MHz LMR channel by an interfering LTE band. The embodiments facilitate scheduling of non-critical broadband data transfers such as device diagnostics, evidence uploads, and software updates and configurations to name a few, such that these non critical broadband transfers take place outside of the standard mission critical narrowband operations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A portable communication device, comprising:
an applications processor (AP) operatively coupled to a broadband modem;
a baseband processor (BP) operatively coupled to a narrowband modem;
an external power switch;
a power control module operatively coupled to the external power switch, the applications processor and the baseband processor;
in response to the power control module being turned on, the portable communication device being configured to:
enter, by the applications processor and the broadband modem, a broadband restricted state in which transfers of broadband data between the applications processor and the broadband modem are limited, and transfers of narrowband data between the baseband processor and the narrowband modem are unrestricted; and
in response to the power control module detecting the external power switch being turned off the portable communication device being configured to:
trigger an AP-BP handshake, by the power control module, informing both the applications processor and the baseband processor of a power down;
transfer, in response to the AP-BP handshake, pending broadband data from the baseband processor to the applications processor;
power down the baseband processor, thereby guaranteeing that the first modem is off;
enter a broadband unrestricted state, by the applications processor, in which the applications processor transfers broadband data comprising the pending broadband data from the baseband processor along with pending broadband data present in the applications processor to the broadband modem; and
transitioning by the applications processor to an off state.
2. The portable communication device of claim 1, wherein the transitioning of the applications processor to the off state occurs as a result of one of:
completion of the applications processor transferring data to the broadband modem;
expiration of a configurable time-out timer.

3. The portable communication device of claim 1, wherein the pending broadband data is non-mission critical data.

4. The portable communication device of claim 3, wherein the non-mission critical data comprises analytical data pertaining to device management operation of the portable communication device.

5. The portable communication device of claim 4, the analytical data comprises one or more of: diagnostics, log reports, error reports, sensor data, firmware data, evidentiary data, and provisioning data.

6. The portable communication device of claim 1, wherein the unrestricted broadband state is subject to a time bound threshold.

7. The portable communication device of claim 1, wherein the broadband modem uses at least one of:
long term evolution (LTE) technology;
a WIFI technology.

8. The portable communication device of claim 1, wherein the narrowband modem comprises:
a land mobile radio (LMR) modem operating mission critical features.

9. The portable communication device of claim 1, wherein mission critical features comprise one or more of:
push-to-talk (PTT);
mission critical scan;
emergency; and
loud audio.

10. The portable communication device of claim 1, wherein broadband restricted state is one in which large broadband data transfers are prohibited and the broadband modem is operating in a lower power consumption mode.

11. The portable communication device of claim 1, wherein the broadband unrestricted state is one in which applications processor and broadband modem are operational for full bandwidth data transfers and the baseband processor is in a powered off state.

12. The portable communication device of claim 1, the broadband unrestricted state is entered into in response to the power control module detecting one of:
a user-controlled switch being powered off at the portable communication device, wherein the portable communication device already has an attached battery;
a battery attachment to the portable communication device while the portable communication device is off;
attachment of a battery charger while the portable communication device is already turned off.

13. The portable communication device of claim 1, wherein the broadband restricted state reduces current drain and mitigates RF interference to the narrowband modem.

14. A method for managing broadband data communications in portable communication device, the method comprising:
detecting a power off input at a power control module;
triggering a handshake between a baseband processor and an applications processor in response to detecting the power off input;
transferring broadband communications data from the baseband processor to the applications processor in response to the handshake;
powering down the baseband processor; and
entering a broadband unrestricted state, by the application processor, in which broadband data is transmitted and received between the applications processor via broadband modem of the portable communication device;
transitioning the applications processor to an off state in response to:
expiration of a configurable time-out timer; or
completing the transfer of data from the applications processor to the broadband modem.

15. The method of claim 14, wherein detecting the power off input at the power control module comprises one of:
detecting, by the power control module, an external user-controlled switch being turned off at the portable communication device, wherein the portable communication device already has an attached battery;
detecting initial battery attachment to the portable communication device, by the power control module, while the external power control switch is turned off;
detecting by the power control module, attachment of a battery charger while the external power control switch of the portable communication device is off.

16. The method of claim 14, further comprising:
turning on the external user controlled power switch of the portable communication device;
detecting a power on input at the power control module in response to turning on the external user-controlled switch; and
entering a broadband restricted state in which data transfers between the applications processor and the broadband modem are limited and data transfers between the baseband processor and a narrowband modem are unrestricted, thereby providing converged operation of the portable communication device.

17. The method of claim 14, wherein the baseband processor controls land mobile radio (LMR) features and the applications processor controls non-LMR features.

18. The method of claim 17, wherein the non-LMR functionality comprises at least one of:
long term evolution (LTE);
WIFI.

19. A method of managing broadband data communications in a portable communication device, comprising:
turning on the portable communication device via an external user control;
enabling unrestricted narrowband operation via a baseband processor and a narrowband modem, and enabling restricted broadband operation via an applications processor and a broadband modem, thereby providing normal converged operation;
turning off the portable communication device via the external user control;
detecting an off input at a power control module, thereby shutting down narrowband communications and activating unrestricted broadband operation;
transmitting and receiving broadband data;
detecting that the external power control remains off,
verifying status of a timeout timer;
in response to the timeout timer having expired, powering off the applications processor, thereby turning off the portable communication device;
in response to the timeout timer having not expired, verifying if the broadband data transfer is complete, and powering off the applications processor when the data transfer is complete, thereby turning off the portable communication device.

20. The method of claim 19, further comprising:
detecting that the external power control has been turned back on; and
returning back to unrestricted narrowband operation and restricted broadband operation in response, thereto returning to normal converged operations.

21. The method of claim 19, wherein mission critical narrowband communications and restricted non-mission critical broadband communications take place during normal converged operations, and only non-mission critical data communications take place during unrestricted broadband operation.

22. A converged portable communication device, comprising:

a first processor and first modem for managing mission-critical communications;

a second processor and second modem for managing non-mission mission-critical communications; and the second processor, in response to an external user-initiated action, enabling non-mission critical data transfers with the second modem, while the first processor and first modem remain off, wherein the external user-initiated action comprises one of:

turning off an external on/off switch while a battery is already attached to the portable communication device;

attaching a battery to an already turned off portable communication device; and attaching a charger to an already turned off portable communication device having a battery already attached thereto.

* * * * *